(12) United States Patent
Parks

(10) Patent No.: US 8,719,208 B2
(45) Date of Patent: May 6, 2014

(54) CERTAINTY FACTOR DECAY

(75) Inventor: Gregory H. Parks, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 12/260,504

(22) Filed: Oct. 29, 2008

(65) Prior Publication Data

US 2010/0106673 A1 Apr. 29, 2010

(51) Int. Cl.
*G06F 17/00* (2006.01)
*G06N 5/02* (2006.01)

(52) U.S. Cl.
USPC .............................. 706/50; 701/117; 701/118

(58) Field of Classification Search
None
See application file for complete search history.

(56) References Cited

U.S. PATENT DOCUMENTS

| | | | |
|---|---|---|---|
| 5,386,498 A | 1/1995 | Kakefuda | |
| 5,418,888 A | 5/1995 | Alden | |
| 5,493,729 A * | 2/1996 | Nigawara et al. | 706/52 |
| 5,793,045 A * | 8/1998 | DiFilippo et al. | 250/363.03 |
| 6,377,949 B1 * | 4/2002 | Gilmour | 1/1 |
| 7,310,591 B2 | 12/2007 | Ida | |
| 7,337,127 B1 | 2/2008 | Smith et al. | |
| 7,606,784 B2 * | 10/2009 | Mathias et al. | 706/52 |
| 2003/0065409 A1 * | 4/2003 | Raeth et al. | 700/31 |
| 2007/0211692 A1 | 9/2007 | Boroski et al. | |
| 2008/0071465 A1 * | 3/2008 | Chapman et al. | 701/117 |
| 2008/0147574 A1 | 6/2008 | Chidlovskii | |
| 2008/0309777 A1 * | 12/2008 | Aoyama | 348/222.1 |

FOREIGN PATENT DOCUMENTS

WO 2008051929 A2 5/2008

OTHER PUBLICATIONS

"Managing Rules", retrieved at <<http://msdn.microsoft.com/en-us/library/bb429303(VS.80).aspx>>, Aug. 7, 2008, pp. 6.
"Backward Chaining with Uncertainty", retrieved at <<http://www.amzi.com/ExpertSystemsInProlog/03backwarduncertainty.htm>>, Aug. 7, 2008, pp. 15.

\* cited by examiner

*Primary Examiner* — Kakali Chaki
*Assistant Examiner* — Luis Sitiriche
(74) *Attorney, Agent, or Firm* — John Jardine; Andrew Sanders; Micky Minhas

(57) ABSTRACT

Various embodiments provide a way to decrease the certainty of a piece of information. In at least some embodiments, a certainty factor and a decay rate are associated with the piece of information. The certainty factor indicates the certainty of a piece of information. As time passes, the decay rate is applied to the certainty factor to reduce the certainty factor, thereby providing an indication that the certainty of the information has decreased.

20 Claims, 5 Drawing Sheets

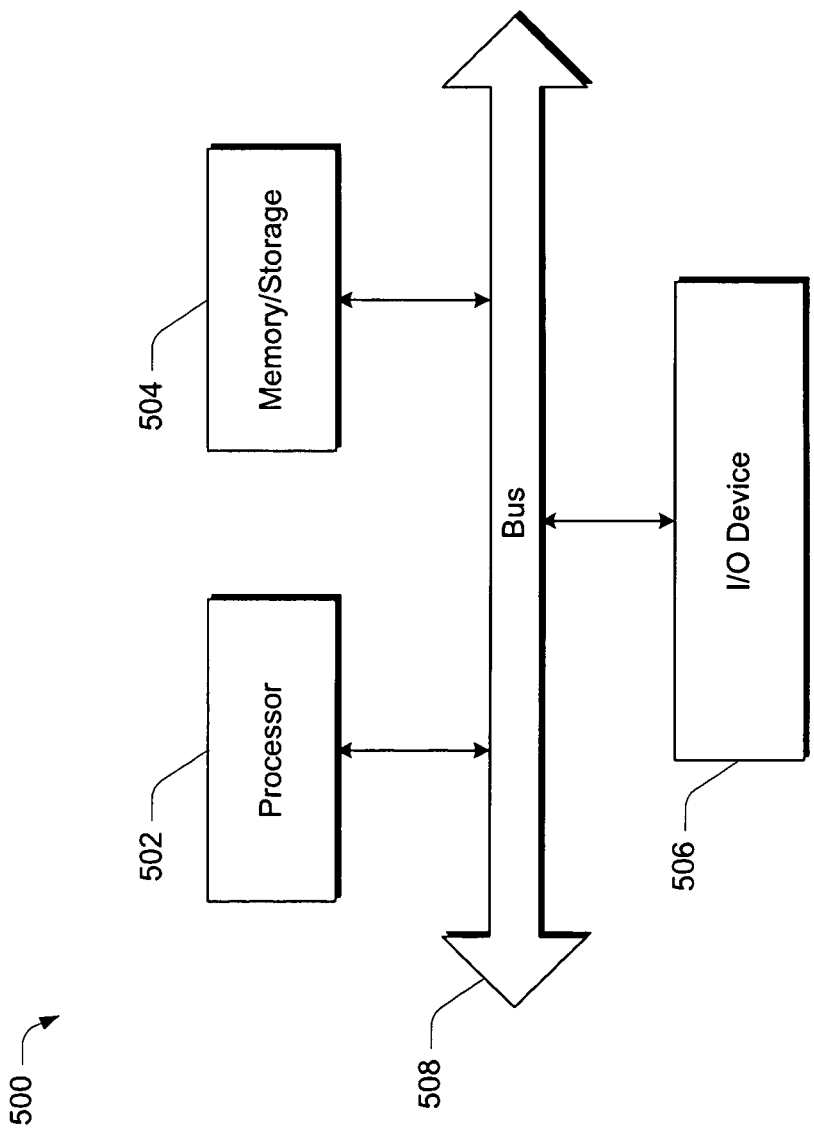

CERTAINTY FACTOR DECAY

BACKGROUND

Computing systems can provide information that has been derived from a variety of different sources. For instance, some computing systems provide information that has been derived from one or more sensors that measure aspects of the physical world. A computing device, for example, that is equipped with a GPS sensor can provide information about the location of the computing device. Information, however, may decrease in certainty over time. For example, if a GPS sensor determines the location of a computing device, the information related to the location of the computing device may be less certain one hour later unless updated in the interim. Accordingly, computing systems would like to be able to represent the certainty of information as time passes and the information decreases in certainty.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a way to decrease the certainty of a piece of information over time. In at least some embodiments, a certainty factor and a decay rate are associated with the piece of information. The certainty factor indicates the certainty associated with a piece of information. As time passes, the decay rate is applied to the certainty factor to reduce the certainty factor, thereby providing an indication that the certainty of the information has decreased.

In at least some embodiments, the information comprises context information stored in a context store on a context platform. A certainty factor and a decay rate are associated with each piece of context information stored in the context store. In at least some embodiments, a decay application is configured to regularly or continuously access pieces of context information and the certainty factor and decay rate associated with each piece of context information. The decay application applies the associated decay rate to the associated certainty factor thereby reducing the certainty factor, and then associates the reduced certainty factor with the piece of context information.

BRIEF DESCRIPTION OF THE DRAWINGS

The same numbers are used throughout the drawings to reference like features.

FIG. 5 is a block diagram of an example system that can be utilized to implement one or more embodiments.

DETAILED DESCRIPTION

Overview

Figure 1:
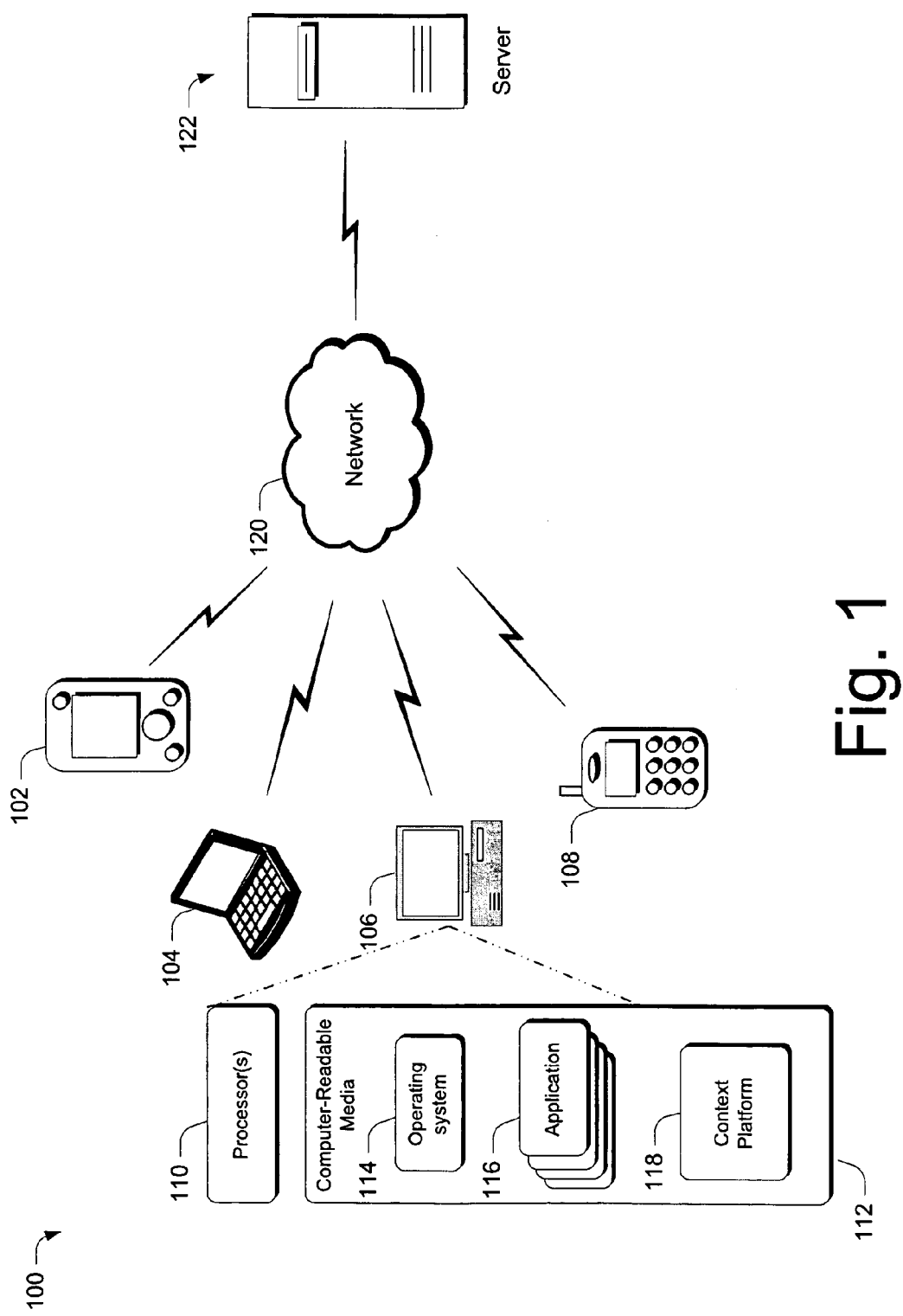
FIG. 1 illustrates an operating environment in accordance with one or more embodiments.

In at least some embodiments, a certainty factor and a decay rate are associated with piece(s) of information. The certainty factor indicates the certainty of a piece of information. As time passes, the decay rate is applied to the certainty factor to reduce the certainty factor, thereby providing an indication that the certainty of the information has decreased.

In at least one embodiment, the information comprises context information stored in a context store that is part of a context platform. The context platform provides a way for applications and computing devices to acquire or substantiate knowledge about context, such as information about the environment, a computing device user's intentions, and/or the use to which the computing device is being put, to name just a few. The context platform includes, among other things, a context store, context providers, and context consumers. In general, context providers enable a computing device and/or applications to determine context, whereas context consumers use context to implement a variety of different functions.

More specifically, the context store is the location where context information is instantiated, accessed, or updated. Access may be provided to a wide variety of different devices and applications, such as gadgets, third-party applications, web applications, and the like. Context providers include devices and applications that can establish and maintain contexts and values in the context store. Sensor devices, such as GPS devices, are a special type of context provider that provide context about the physical world. Context consumers include components that can query context values or subscribe to changes in context values. So-called effectors are a special type of context consumer that employ a uniform way to manipulate the physical environment so that contextual devices can control devices supplied by different manufacturers that affect the physical world.

In at least some embodiments, a certainty factor and a decay rate is associated with each piece of context information stored in the context store on the context platform. In at least some embodiments, a decay application, running in the background, is configured to regularly or continuously access pieces of context information and the certainty factor and decay rate associated with each piece of context information. After accessing a piece of context information, the decay application applies the associated decay rate to the associated certainty factor thereby reducing the certainty factor, and then associates the reduced certainty factor with the piece of context information, thereby providing an indication that the certainty of the information has decreased.

As the decay application regularly or continuously accesses and updates certainty factors associated with pieces of information, various applications and devices, such as context providers and context consumers, may be able to access the context information at the same time. Context providers and context consumers may also be able to add, remove, or modify both pieces of context information as well as the certainty factors and decay rates associated with the pieces of context information.

In the discussion that follows, a section entitled "Operating Environment" describes but one operating environment that can be utilized to practice the inventive principles described herein in accordance with one or more embodiments. Following this, a section entitled "Context Platform" is provided and describes how a context platform, configured to execute on one or more devices and/or servers, can be utilized to practice the inventive principles described herein in accordance with one or more embodiments. Following this, a section entitled "Certainty Factor Decay" is provided and describes how certainty factors associated with pieces of information can be reduced using an associated decay rate. Following this, a section entitled "Decay Application" is provided and describes an example decay application that is configured to decay certainty factors associated with pieces of information.

Next, a section entitled "Example Method" describes an example method in accordance with one or more embodiments. Last, a section entitled "Example System" describes an example system that can be utilized to implement the described embodiments.

Operating Environment

FIG. 1 illustrates an operating environment in accordance with one or more embodiments, generally at 100. Operating environment 100 includes multiple different computing devices, examples of which are shown at 102, 104, 106, and 108. The computing devices can be used to determine and store pieces of information. Individual computing devices can typically include one or more processors 110, one or more computer-readable media 112, an operating system 114, one or more applications 116 that reside on the computer-readable media and which are executable by the processor(s), and a context platform 118. Context platform 118 can be used to determine and store context information and to perform various functions using the context information, as will become apparent below. Applications 116 can include, by way of example and not limitation, one or more context providers and context consumers.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 120, such as a local network or the Internet, via which information, such as context information, can be requested and sent.

Operating environment 100 also includes, in at least some embodiments, a server 122. Server 122, like the individual computing devices, may be used to determine and store pieces of information. In at least some embodiments, server 122 can include a context platform that can be used to determine and store context information and to perform various functions using the context information. Server 122 may also be able to access context information from the individual computing devices and distribute the context information between the individual computing devices.

The computing devices can be embodied as any suitable computing device such as, by way of example and not limitation, a desktop computer (such as computing device 106), a portable computer (such as computing device 104), a handheld computer such as a personal digital assistant (such as computing device 102), a cell phone (such as computing device 108), and the like.

Having discussed the general notion of an example operating environment in which various embodiments can operate, consider now a more detailed discussion of the context platform.

Context Platform

As noted above, certainty factors of various types of information can be decayed. In accordance with various embodiments, decay rates are applied to certainty factors associated with context information stored in a context store. The context store is part of a context platform. The context platform provides a way for applications and computing devices to acquire or substantiate knowledge about context, such as information about the environment, a computing device user's intentions, the use to which the computing device is being put, and the like.

Figure 2:
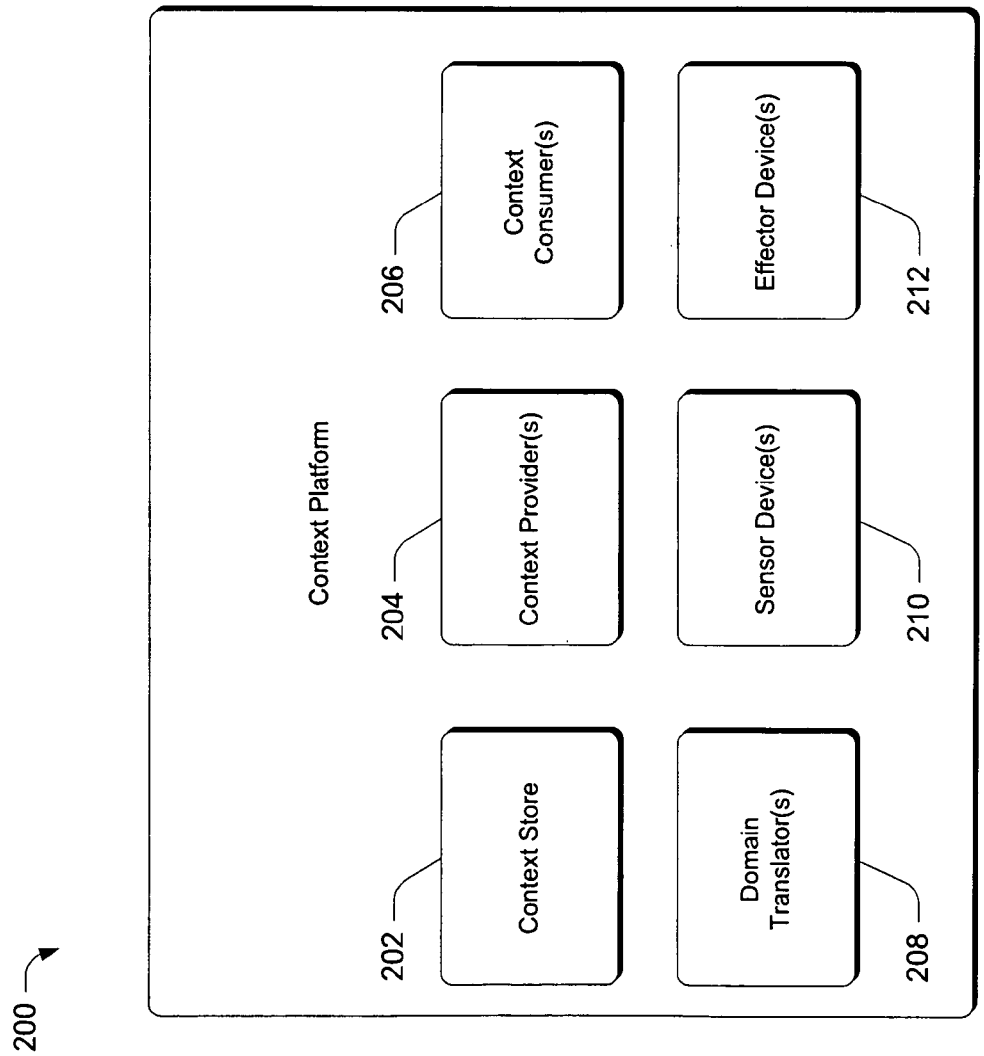
FIG. 2 illustrates a context platform in accordance with one or more embodiments.

FIG. 2 illustrates, in accordance with one or more embodiments, a context platform 200 that can reside on any of the multiple computing devices 102, 104, 106, and/or 108 or on server 122, depicted in FIG. 1.

Context platform 200 includes a context store 202, context provider(s) 204, context consumer(s) 206, a domain translator(s) 208, sensor device(s) 210, and effector device(s) 212. These components are individually discussed below.

Context Store

In one or more embodiments, context store 202 is the location where context information is instantiated, accessed, or updated. Access may be provided to wide variety of different devices and applications, such as gadgets, third-party applications, and web applications, to name just a few. The context store may include a set of context/value pairs denoted <context, [values]>. Individual contexts may be referred to by an ID and describe a context that is described by specific values. For example, a user's current GPS position could be referred to as <GPS_position, [latitude, longitude]>. That context may be a well-known public context description that is published by a third party, or a private context that is used for intermediate or final inferencing purposes. In at least some embodiments, access to the context store can be permissioned and may be specific to a device, a user, an application, or some combination of these.

In one or more embodiments, a certainty factor and a decay rate is associated with each piece of context information stored in the context store. For example, GPS position context information may have an associated certainty factor value and an associated decay rate. As will be discussed in more detail below, a decay application is configured to access the context information and decrease the certainty factor associated with the context information by applying the decay rate to the certainty factor.

Context Provider(s)

Context provider(s) 204 include devices and applications that can establish and maintain contexts and values in the context store. For instance, sensors are a type of context provider that maintains information about the physical world in the context store. Context providers, however, can also be logical. For example, a logical provider could be an application that queries states of other applications, such as whether a presentation is in progress or e-mail is being read, and instantiates state information in the context store.

In some instances, context providers may be configured to read, write, or update the pieces of context information stored in context store 202. Furthermore, when a context provider updates or adds a new piece of context information, the application may also provide a new certainty factor associated with the new piece of context information.

Context Consumer(s)

Context consumer(s) 206 include components that can query context values or subscribe to changes in context values. Using contexts and context values, context consumers can subscribe to changes in context values or query values if needed. For example, a context consumer could subscribe to a context event that the context store fires when the context "at home" is fired in response to the user walking in the front door of her home.

In some instances, context consumers may be configured to read, write, or update the pieces of context information stored in context store 202. Furthermore, when a context consumer updates or adds a new piece of context information, the application may also provide a new certainty factor associated with the new piece of context information.

Domain Translator(s)

Context providers and consumers interact with the context store by means of rules. Context, read by consumers, is processed by rules that cause providers with access to the context store to establish changes to the context values in the store. Rules use some logic to reason about changes in context and establish changes in context values. Rules can be any kind of logical system that can read from and write to the context store. Inferencing methods can be used by the domain translators and can include, among others, algorithms, heuristics, predicate logic, fuzzy logic, expert systems, neural networks, and Bayesian networks. The combination of provider, consumer, and rules creates domain translator(s) 208. More than one kind of domain translator can exist in the system simultaneously. Further, domain translators can be generically programmable or very domain-specific. The richness of the system is enhanced by having a plethora of different domain translators participating in the instantiation and analysis of context.

Sensor Device(s)

Sensor device(s) 210 are a special type of context provider. Generally, sensors may alter context but may not respond to changes in context. However, changes in context may alter the ways in which sensors analyze or report sensor data. Examples of sensor devices include GPS devices, accelerometers, light sensors, compasses, cameras, microphones, thermometers and the like. Sensor devices interface with the context platform through a standard mechanism for discovering and connecting sensor class devices and for describing data from common types of sensors in a uniform but extendable manner.

Effector Devices

Effector device(s) 212 are a special type of context consumer. Generally, most effector devices are the mirror image of sensor devices in that they may respond to changes in context but may not alter context values. However, changes in effector states may be sensed in order to help ensure that effector actions have actually occurred according to instruction. For example, the value of the context "front door closed" could be tied directly to an effector that can open or close the door. The position of that effector, either open or closed, would be a direct reflection of the value of that context. Another example is an effector that controls the brightness of an LCD backlight, the backlight brightness being a direct reflection of the value of the context "backlight brightness."

Accordingly, the context platform provides a way for applications and computing devices to acquire or substantiate knowledge about context, such as information about the environment, a computing device user's intentions, and the use to which the computing device is being put, through the use of context providers. Information and knowledge about context acquired by context providers is stored in the context store, where this context information becomes accessible to a wide variety of different context consumers.

Having now discussed an example context platform in which various embodiments can operate, consider now a discussion of how the certainty of information, such as context information stored in a context store, can be decreased by applying an associated decay rate to an associated certainty factor.

Certainty Factor Decay

In various embodiments, a decay rate is applied to information to decrease the certainty of the information. Doing so can provide a more accurate representation of the information's certainty because some information typically decreases in certainty over time. Consider, for example, that a computing device detects that a door to a house has been opened. The computing device can store information that the door to the house is open in a database. However, as time passes, the certainty that the door is still open decreases. Furthermore, computing devices can derive a variety of inferences from information stored in a database. Often times, these inferences are not entirely certain. For example, if the door to the house is opened, a computing device may be able to infer that a person has entered the house and is currently located within the house. However, this inference may not be entirely certain at the time it is made, for example, because the user may have exited the house. Furthermore, this inference will decrease in certainty over time.

In at least some embodiments, a certainty factor is associated with a piece of information, such as context information, to provide an indication of the certainty of the piece of information. It is to be appreciated that in some instances an associated certainty factor may be stored as a part of the information itself, whereas in other instances, the certainty factor may be linked to the information, such as by configuring the information with a pointer to the certainty factor.

In at least some embodiments, a certainty factor may range between values of 1.0 and 0.0, where a value of 1.0 indicates that a piece of information is 100% certain, whereas a value of 0.0 indicates that the information is 100% uncertain. In other embodiments, a certainty factor may range between values of 1.0 and −1.0, where a value of −1.0 indicates absolute uncertainty. For example, information that the door is opened may be provided with a certainty factor value of 1.0 at the time that the door is opened because this information is 100% certain. However, an inference that a person has entered the house (based on the door being opened) may be provided with a lower certainty factor value, such as 0.75, which represents the fact that there is some uncertainty whether the person is in the house. By associating a certainty factor with a piece of information, a variety of different applications, components, devices, and/or users are able to ascertain the certainty that the piece of information is accurate.

For example, suppose in the example context platform discussed above, that a user's current GPS position is determined by a sensor device attached to the context platform and stored in the context store as <GPS_position, [latitude, longitude]>. This piece of context information is most likely true at the time that it is determined by the sensor device. Accordingly, a high certainty factor may be associated with the context information when the context information is determined. However, as time passes, it becomes less and less certain that the GPS location is still accurate unless the location has been updated in the interim.

Thus, in various embodiments, a decay rate is used to decrease the certainty factor associated with pieces of information to represent the fact that information, such as context information, decreases in certainty over time. In general, in at least some embodiments, a decay rate can decrease a certainty factor by a certain percentage during a particular period. In some cases, more complex formulas or decay rates may be used, such as linear, exponential, or logarithmic formulas or rates. Continuing with the GPS location example, a decay rate associated with the GPS location context information can be applied to the associated certainty factor to reduce the value of the certainty factor. Doing so can indicate to various components and applications, such as context providers, context consumers, and domain translators, that the certainty of the GPS location context information has decreased due to the possibility that the person has moved.

The specific formula used for a decay rate can be determined from a variety of different factors, including but not limited to the frequency that the information is updated, the frequency that the information is accessed, the importance of the information, the final certainty factor value, and one or more relevance periods.

The frequency that the information is updated corresponds to the amount of time that occurs between updates of a piece of information by various components, devices, or applications, such as sensors, context providers, context consumers, and domain translators. For instance, a GPS sensor may be configured to update the location of a computing device every 5 seconds. In this case, it would have little effect for a decay rate to decay the GPS context information over a period of several hours, because the GPS context information would have been updated thousands of times over that period. However, once the updates cease, or become less frequent, the decay rate would have a much greater effect.

The frequency that the information is accessed is the number of times that a piece of information is accessed by various components, devices, and/or applications, such as context providers and context consumers, over a given time period. Information that is frequently accessed may need to have a more precise decay rate than information that is infrequently accessed. In addition, the importance of the information may also affect the decay rate. For example, highly salient information may require a more accurate certainty factor, and hence more precise decay rate, than information that is less important.

The final certainty factor value is the desired value to which a certainty factor will decay. For example, for some information, the final desired certainty factor value may be 0.0. Therefore, a decay rate may be provided that will decay the certainty factor value all the way to a value of 0.0. In other instances, however, it may be desirable to never reach a certainty factor value of 0.0. For example, some information may never lose a degree of its certainty. Furthermore, in some cases decaying a certainty factor may be used as a way to forget information as presently important while still retaining that information in memory as having been important at one time. For example, perhaps GPS context information is provided that a user has entered a specific grocery store. A day later it may be of little, if any, importance to a location application, that provides the current location of the user, to know that the user had been in the grocery store a day earlier. However, an application tracking the user's day to day schedule may be interested in retaining the information that the user visited the grocery store at one time. In this case, a decay rate can be chosen that will not decay the certainty factor all the way to 0.0, thereby maintaining the relevance of the information.

Finally, a decay rate can be provided that decays at a certain rate over a specific time period, and at one or more different rates over one or more different time periods. For instance, in some cases it may be desirable to decay information very quickly initially, and then slowly after the initial period. In other instances it may be desirable to slowly decay the certainty factor value initially, and then once a specific amount of time has elapsed, to decay the certainty factor value rapidly.

Accordingly, various factors such as the frequency that the information is updated, the frequency that the information is accessed, the importance of the information, the final certainty factor value, and one or more relevance periods, as well as other factors not discussed herein, can be used to determine decay rates.

Decay Application

Figure 3:
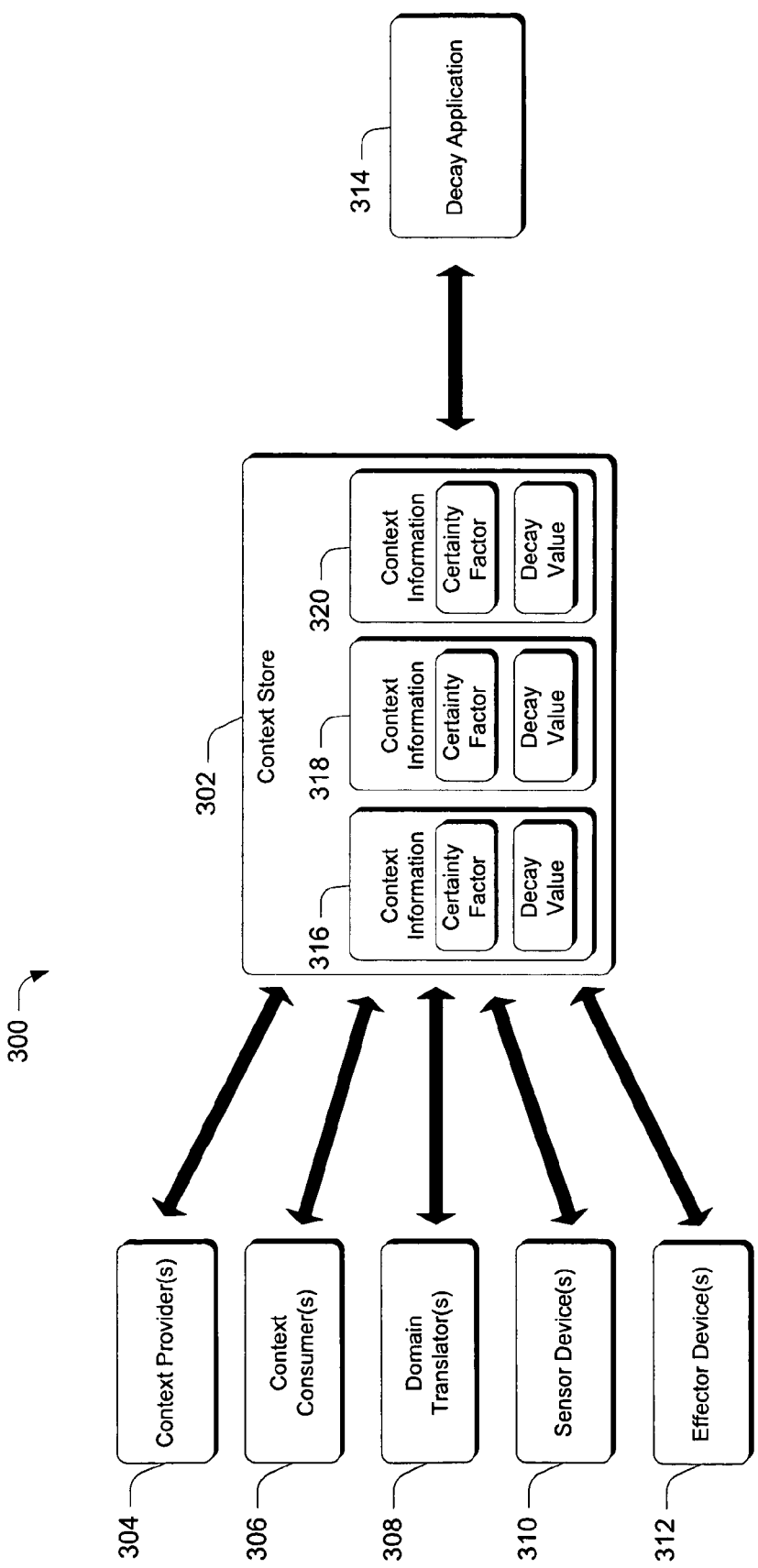
FIG. 3 is a block diagram of an example system that can be utilized to implement one or more embodiments.

FIG. 3 illustrates, in accordance with one or more embodiments, an example system 300 that includes various components in the context platform depicted in FIG. 2, as well as a decay application 314 configured to decay certainty factors associated with one or more pieces of context information. System 300 includes various components and/or applications that are configured to access context information. Specifically, system 300 includes a context store 302. In addition, system 300 includes context providers(s) 304, context consumer(s) 306, domain translator(s) 308, sensor device(s) 310, and effector device(s) 312, all of which are configured to access one or more pieces of context information 316, 318, or 320 stored in the context store 302. Individual pieces of context information 316, 318, and 310 include an associated certainty factor and an associated decay rate. In some instances, these various components or applications are configured to read, write, or update the pieces of context information stored in context store 302. For example, a GPS sensor device may be configured to access the context store to provide updated GPS position context information. When an application updates or adds a new piece of context information, the application may also provide a new certainty factor associated with the new piece of context information.

Decay application 314, in accordance with various embodiments, is configured to access pieces of context information 316, 318, and 320 as well as the certainty factor and the decay value associated with each piece of context information. Access can take place once, regularly or continuously. The decay application is configured to reduce the certainty factor by applying the decay rate to the certainty factor. After reducing the certainty factor, the decay application associates the reduced certainty factor with the piece of context information in the context store.

Various algorithms may be implemented by the decay application to decay the certainty of information. Example code that can be used by a decay application is provided just below:

```
StartDecay( )
{
    Decay-in-force=TRUE;
    StartThread(_decayThread, Period);
}
_decayThread(Period)
{
    Do
    {
        GetListOf(all-information-in-memory);
For (information=first-information; information<=last-information;
information=next-information)
        {
            CF=information.getCF;
            Decay=information.getDecay;
            If ((Decay > 0.0) and (CF < 1.0))
            {
                CF=CF*(1.0-Decay);
            }
        }
    } While(decay-in-force)
}
PutCertainty(information, newCF) // decay begins on next pass from new
value
{
    Information.CF = newCF;
}
GetCertainty(information, threshold)
{
    If (information.getCF > threshold)
        Return "probably true"
    Else if
        Return "probably not true"
}
```

This decay application code retrieves a certainty factor associated with a piece of information ("CF=information.getCF") and a decay rate associated with the piece of information ("Decay=information.getDecay"). In this example, a decay rate is not applied to a certainty factor of 1.0 because the information is 100% certain, nor is it applied to a certainty factor of 0.0 because the information has no certainty associated with it. However, if the certainty factor is between 1.0 and 0.0, the decay application multiplies the certainty factor by 1.0 minus the decay rate ("CF=CF* (1.0−Decay)"). The decay application associates the new certainty factor as the certainty factor associated with the piece of information ("information.CF=newCF").

Example Method

Figure 4:
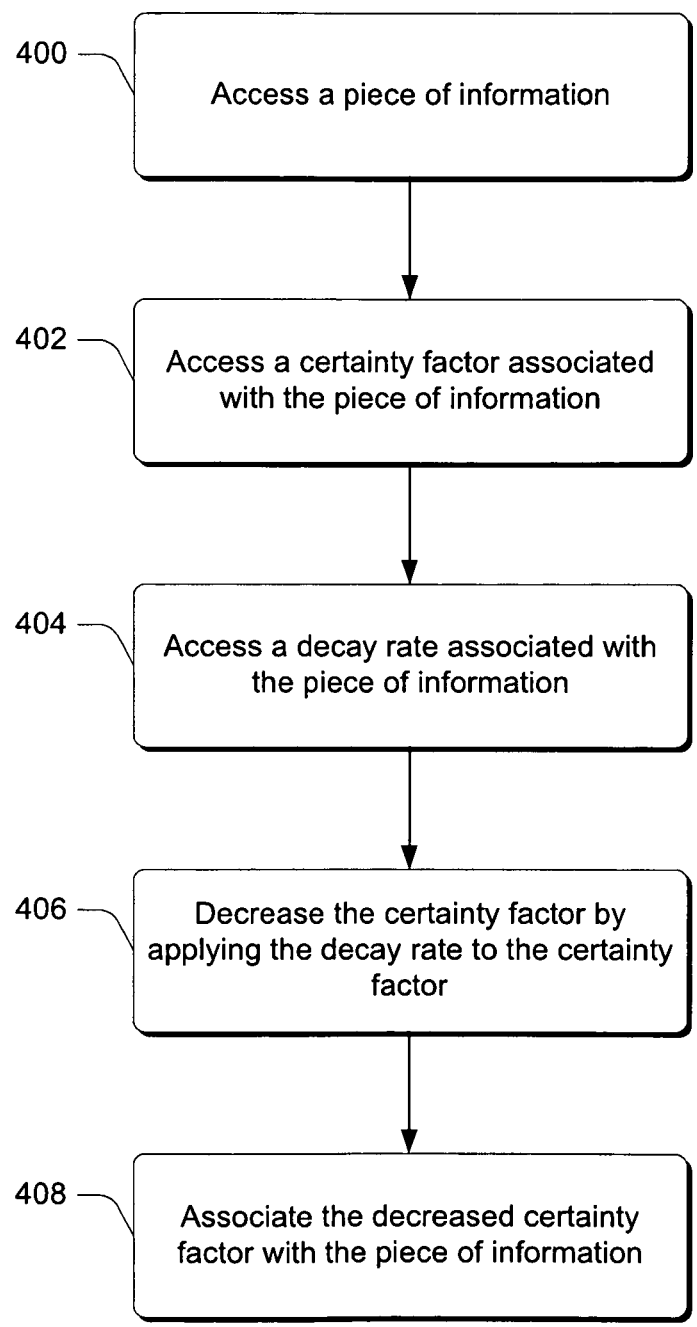
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, aspects of the method can be performed by a decay application executing on a computing device or on a server, such as the computing devices and server illustrated in FIG. 1.

Step 400 accesses a piece of information. In some embodiments, the piece of information is context information stored in a context store such as the context store illustrated in FIGS. 2 and 3. However, it is to be appreciated that the piece of information may comprise any type of information stored in any suitable location. Step 402 accesses a certainty factor associated with the piece of information. Certainty factors, as discussed above, provide an indication of the certainty of a piece of information and may range, in at least some embodiments, between the values of 1.0 and 0.0, where a value of 1.0 indicates that a piece of information is 100% certain whereas a value of 0.0 indicates that the information has no certainty associated with it. It is to be appreciated that in some instances an associated certainty factor may be stored as a part of the information, whereas in other instances, the certainty factor may be linked to the information, such as by configuring the information with a pointer to the certainty factor.

Step 404 accesses a decay rate associated with the piece of information. Decay rates, as discussed above, may be used to decrease the certainty factor associated with pieces of information to represent the fact that information, such as context information, decreases in certainty over time. In general, a decay rate decreases a certainty factor by some value. As discussed above, a decay rate may be derived from a variety of different factors, including but not limited to the frequency that the information is updated, the frequency that the information is accessed, the importance of the information, the final certainty factor value, and one or more relevance periods. It is to be appreciated that in some instances an associated decay rate may be stored as a part of the information, whereas in other instances, the decay rate may be linked to the information, such as by configuring the information with a pointer to the decay rate.

Step 406 decreases the certainty factor by applying the decay rate to the certainty factor. Various algorithms for applying a decay rate to a certainty factor associated with a piece of information can be used, examples of which are provided above. Step 408 associates the decreased certainty factor with the information. In at least some embodiments, the new certainty factor replaces the old certainty factor and is stored back in a context store, such as context store 402 illustrated in FIG. 3.

Having discussed the notion of decreasing the certainty of a piece of information, consider now a discussion of an example system that can be utilized to implement one or more embodiments.

Example System

FIG. 5 illustrates an example computing device 500 that can implement the various embodiments described above. Computing device 500 can be, for example, various computing devices or servers, such as those illustrated in FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide a way to decrease the certainty of a piece of information. In at least some embodiments, a certainty factor and a decay rate are associated with the piece of information. The certainty factor indicates the certainty associated with a piece of information. As time passes, the decay rate is applied to the certainty factor to reduce the certainty factor, thereby providing an indication that the certainty of the information has decreased.

In at least some embodiments, the information comprises context information stored in a context store on a context platform. A certainty factor and a decay rate are associated with each piece of context information stored in the context store on the context platform. In at least some embodiments, a decay application is configured to access pieces of context information and the certainty factor and decay rate associated with each piece of context information from the context store. The decay application is configured to apply the associated decay rate to the associated certainty factor thereby reducing the certainty factor. The context application is configured to then associate the reduced certainty factor with the piece of context information.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter

What is claimed is:

1. A computer-implemented method comprising:
   accessing, by a computing device, a certainty factor associated with a piece of multiple pieces of information that are each associated with a respective certainty factor, wherein the certainty factor associated with the piece of information provides an indication of certainty of that piece of information and is stored in a context store with the piece of information but is accessible from the context store separately from the piece of information, wherein the certainty factor is accessible to maintain the certainty factor by at least one of a context provider that established the certainty factor or another context provider, and wherein the certainty factor is accessible to obtain a value of the certainty factor by one or more context consumers that at least one of queries for the certainty factor or subscribes to changes of the certainty factor;
   accessing a decay rate associated with the piece of information, wherein each of the multiple pieces of information is associated with a respective decay rate;
   decreasing the certainty factor of the piece of information by applying the accessed decay rate to the certainty factor; and
   replacing the certainty factor of the piece of information with a decreased certainty factor.

2. The computer-implemented method of claim 1, further comprising associating a decreased certainty factor with the piece of information.

3. The computer-implemented method of claim 1, wherein the piece of information comprises context information.

4. The computer-implemented method of claim 3, wherein the decay rate is accessed from the context store.

5. The computer-implemented method of claim 1, wherein the decay rate is selected from a group comprising at least: a linear decay rate, an exponential rate, or a logarithmic decay rate.

6. The computer-implemented method of claim 1, wherein applying the decay rate to the certainty factor decreases the certainty factor by a certain percentage during a particular period.

7. The computer-implemented method of claim 1, wherein the decay rate is determined from one or more of: a frequency that the piece of information is updated, a frequency that the piece of information is accessed, an importance of the piece of information, a final certainty factor value, or one or more relevance periods.

8. One or more hardware computer-readable storage media embodying computer executable instructions, which when executed by one or more processors perform a method, comprising:
   accessing, by a computing device, a first certainty factor associated with a first of multiple pieces of information that are each associated with a respective certainty factor, wherein the first certainty factor provides an indication of certainty of the first piece of information and comprises a value stored with the first piece of information that is modifiable without changing the first piece of information;
   accessing a first decay rate associated with the first piece of information, wherein each of the multiple pieces of information is associated with a respective decay rate;
   decreasing the first certainty factor by applying the first decay rate to the first certainty factor;
   associating a decreased certainty factor with the first piece of information to update the first certainty factor;
   accessing a second certainty factor associated with a second piece of information, wherein the second certainty factor provides an indication of certainty of the second piece of information;
   accessing a second decay rate associated with the second piece of information;
   decreasing the second certainty factor by applying the second decay rate to the second certainty factor; and
   associating another decreased certainty factor with the second piece of information to update the second certainty factor.

9. One or more hardware computer-readable storage media as recited in claim 8, wherein the piece of information comprises context information.

10. One or more hardware computer-readable storage media as recited in claim 9, wherein the first and second certainty factors and the first and second decay rates are accessed from a context store.

11. One or more hardware computer-readable storage media as recited in claim 8, wherein the first and second decay rates are selected from a group comprising at least: a linear decay rate, an exponential decay rate, or a logarithmic decay rate.

12. One or more hardware computer-readable storage media as recited in claim 8, wherein applying the first decay rate to the first certainty factor decreases the first certainty factor by a certain percentage during a particular period.

13. One or more hardware computer-readable storage media as recited in claim 8, wherein the first decay rate is determined from one or more of: a frequency that the first piece of information is updated, a frequency that the first piece of information is accessed, an importance of the first piece of information, a final certainty factor value, or one or more relevance periods.

14. A system comprising:
   a context store configured to hold one or more pieces of context information; and
   a decay application configured to:
      access a current certainty factor associated with a piece of context information stored in the context store, wherein other certainty factors are associated with other pieces of context information, respectively, when the context store holds more than one piece of context information, wherein the current certainty factor provides an indication of certainty of the piece of context information at a current time and is stored in the context store with the piece of context information but is accessible from the context store separately from the piece of context information;
      access a decay rate associated with the piece of context information; and decrease the current certainty factor that is associated with the piece of context information by applying the decay rate to the current certainty factor to obtain a decreased certainty factor configured to replace the current certainty factor.

15. The system as recited in claim 14, wherein the decay application is further configured to associate the decreased certainty factor with the piece of context information in place of the current certainty factor.

16. The system as recited in claim 14, wherein the decay rate is selected from a group comprising at least: a linear decay rate, an exponential decay rate, or a logarithmic decay rate.

17. The system as recited in claim 15, wherein applying the decay rate to the current certainty factor decreases the current certainty factor by a certain percentage during a particular period.

18. The system as recited in claim 15, wherein the decay rate is determined from one or more of: a frequency that the piece of context information is updated, a frequency that the piece of context information is accessed, an importance of the piece of context information, a final certainty factor value, or one or more relevance periods.

19. The system as recited in claim 15, further comprising one or more context providers configured to access the one or more pieces of context information stored in the context store.

20. The system as recited in claim 15, further comprising one or more context consumers configured to access the one or more pieces of context information stored in the context store.

* * * * *